US006832076B2

(12) United States Patent
Study et al.

(10) Patent No.: US 6,832,076 B2
(45) Date of Patent: Dec. 14, 2004

(54) AUDIBLE DIAGNOSTIC INFORMATION APPARATUS AND METHOD

(75) Inventors: Robert Study, Arlington Heights, IL (US); Eric Robb, Carol Stream, IL (US); Thomas A. Brookbank, Chicago, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 46 days.

(21) Appl. No.: 10/073,663

(22) Filed: Feb. 11, 2002

(65) Prior Publication Data

US 2003/0153307 A1 Aug. 14, 2003

(51) Int. Cl.$^7$ .......................... H04B 17/00; H04B 7/00; H04Q 9/00

(52) U.S. Cl. .................. 455/67.7; 455/66.1; 455/67.11; 340/5.7

(58) Field of Search ............................ 455/39, 500, 66, 455/67.1, 67.7; 340/5.1, 5.2, 5.26, 5.3, 5.32, 5.61, 5.62, 5.64, 5.7, 5.71, 5.72, 5.73, 825.36, 825.37, 384.1; 318/16

(56) References Cited

U.S. PATENT DOCUMENTS

| | | | | | |
|---|---|---|---|---|---|
| RE29,525 | E | | 1/1978 | Willmott | |
| 4,385,296 | A | | 5/1983 | Tsubaki et al. | |
| 4,750,118 | A | | 6/1988 | Heitschel et al. | |
| 4,855,713 | A | | 8/1989 | Brunius | |
| 4,859,990 | A | | 8/1989 | Isaacman | |
| 5,365,214 | A | * | 11/1994 | Angott et al. | 340/328 |
| 5,473,318 | A | | 12/1995 | Martel | |
| RE35,364 | E | | 10/1996 | Heitschel et al. | |
| 5,780,987 | A | * | 7/1998 | Fitzgibbon et al. | 318/466 |
| 5,781,143 | A | * | 7/1998 | Rossin | 341/173 |
| 5,854,593 | A | * | 12/1998 | Dykema et al. | 340/825.22 |
| 5,949,349 | A | * | 9/1999 | Farris et al. | 340/5.26 |
| RE36,703 | E | | 5/2000 | Heitschel et al. | |
| 6,166,650 | A | | 12/2000 | Bruwer | |
| 6,198,034 | B1 | * | 3/2001 | Beach et al. | 84/600 |
| 2002/0097161 | A1 | * | 7/2002 | Deeds | 340/601 |

OTHER PUBLICATIONS

International Search Report for PCT patent application PCT/US03/03786 completed on Apr. 7, 2003.

* cited by examiner

*Primary Examiner*—Vivian Chin
*Assistant Examiner*—Raymond B. Persino
(74) *Attorney, Agent, or Firm*—Fitch, Even, Tabin & Flannery

(57) ABSTRACT

A control unit 11 responds in ordinary course to external stimuli. In addition, the control unit 11 further processes the external stimuli to characterize and otherwise seek to identify certain aspects and attributes. Unique audible signals that correspond to varying results of such analysis are then provided. These audible signals can readily facilitate ease and accuracy when diagnosing the cause of a particular operational issue. In one embodiment the diagnostic audible signals are selectively mutable without concurrently muting other audible signals as correspond to ordinary operation of the control unit 11.

14 Claims, 3 Drawing Sheets

AUDIBLE DIAGNOSTIC INFORMATION APPARATUS AND METHOD

TECHNICAL FIELD

This invention relates generally to devices that respond to external stimuli, and more particularly to diagnosing issues of concern as pertain to such devices.

BACKGROUND

Various known devices respond in various ways to external stimuli. For example, movable barrier operators receive transmissions from remote control transmitters and respond by operating a movable barrier in specific ways (such as by opening the movable barrier to allow a user to pass thereby). Many such devices include safeguards to prevent unauthorized operation of the device and/or other devices or apparatus as are controlled by such a device. For example, a remote control transmitter usually includes at least a unique identification code within its transmission. The movable barrier operator will examine incoming transmissions and only respond externally to transmissions that include such an indication of authentication.

As various systems become more diverse and complicated, including movable barrier operators as used on a campus, apartment complex, military post, and so forth where hundreds of remote control transmitters are commonly required to interact with the operator, it becomes correspondingly more complicated to diagnose the cause of an issue when something doesn't appear to be functioning properly. For example, it may be readily observable that a given transmitter does not cause the movable barrier operator to move the movable barrier in a desired fashion. Why such a condition exists, however, may be less clear. The possibilties in such an example can include: the battery in the transmitter is depleted; the transmitter is not presently registered with the movable barrier operator; the transmitter is presently registered with the movable barrier operator but is presently blocked; the transmitter is transmitting an unknown signal; the transmitter is transmitting a fixed code and the movable barrier operator is expecting a rolling code (or vice versa); and the transmitter is transmitting a rolling code that is not synchronized to the rolling code that the movable barrier operator expects to receive for this particular transmitter, to name a few.

Diagnostic equipment for most situations (including for the example provided above) of course exist. Such equipment can be expensive, however, or require highly trained personnel to effect proper usage. Further, such equipment can be expensive and/or cumbersome and hence may not be readily or conveniently available when seeking to address an immediate concern. In other cases where some self-diagnostic capability is provided, the user interface is often rendered difficult to access and sometimes even requires partial disassembly of the unit itself.

BRIEF DESCRIPTION OF THE DRAWINGS

The above needs are at least partially met through provision of the audible diagnostic information apparatus and method described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

Generally speaking, pursuant to these various embodiments, for a device having a plurality of actions, wherein at least some of the actions comprise a response to external stimuli, a determination can be made to identify specific external stimuli and a unique audible signal then provided that corresponds to that identification. For example, and again using the example of a movable barrier operator system, the determination can identify that a given remote control transmission is not recognized (that is, the transmitter is not entered into the system). This would indicate that the transmitter is likely not a legitimate part of this particular movable barrier system. As another example, the determination could identify that a given remote control transmission includes a fixed code or a rolling code, and a unique audible signal then provided that corresponds to those specific conditions. In a fixed code system, for example, upon hearing the unique audible signal indicating that a given transmission includes a rolling code would allow a system operator to readily and easily diagnose why that particular transmitter fails to successfully operate the system. In one embodiment, such diagnostic audible signals can be muted. In another embodiment, when muting diagnostic audible signals, other audible signals (such as signals indicating that a transmission has been received from an intentionally block transmitter or signals that indicate that a transmission has been received from an authorized transmitter) are nevertheless left un-muted.

Referring now to the figures, additional details regarding these and other embodiments will be provided.

Figure 1:
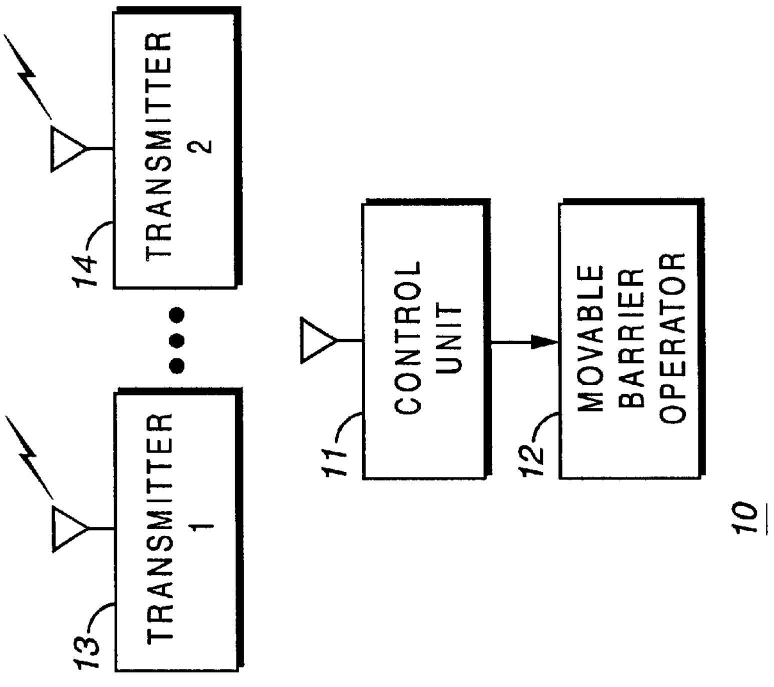
FIG. 1 comprises a block diagram depiction of a movable barrier system that serves as an exemplary embodiment configured in accordance with the invention.

Referring to FIG. 1, a given system 10, in this embodiment, includes a control unit 11 that is coupled to a movable barrier operator 12 such that the control unit 11 can provide control signals to the movable barrier operator 12 to thereby control, at least to some extent, a movable barrier as operated by the movable barrier operator 12. The control unit 11 provides such control signals in response to receiving appropriate transmissions from any of a plurality of previously registered remote control transmitters (represented here by transmitter 1 and transmitter 2 as denoted by reference numerals 13 and 14). The number of transmitters supported will vary with the application, and will typically number in the hundreds, though 1,000 or more are certainly possible. In this particular embodiment, up to 250 such transmitters are presumed to be supported by the system 10. Pursuant to the embodiments described below, diagnostic information regarding certain aspects of transmissions as received by the control unit 11 are developed and used to provide unique corresponding audible signals to a user.

Figure 2:
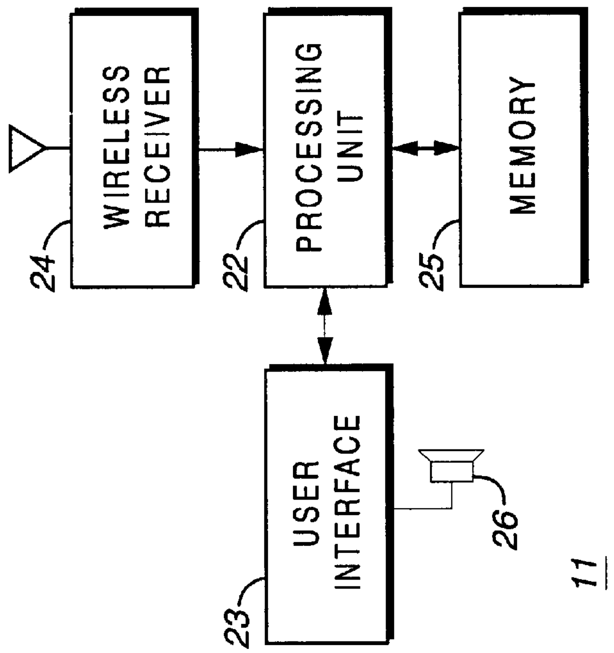
FIG. 2 comprises a block diagram depiction of a control unit embodiment as configured in accordance with the invention.

Referring now to FIG. 2, the control unit 11 includes a processing unit 22 as provided, for example, through use of a microprocessor with supporting circuitry and outlying components. The processing unit 22 preferably comprises a programmable platform that is programmable to effect the activities described below. The processing unit 22 couples to a user interface 23 which will typically be disposed in a manner that is accessible to a user (more details regarding the user interface 23 are provided below). The user interface 23 allows a user to interact directly with the control unit 11, for example, by muting audible diagnostic signals. In this embodiment, the processing unit 22 also couples to a wireless receiver 24 that at least receives transmissions from various transmitters including the remote control transmitters that are authorized through pre-registration with the control unit 11. In addition, the processing unit 22 couples to a memory 25. This memory contains the transmitter information noted above. Also, in this embodiment, the user interface 23 includes an audible signal generator 26. The audible signal generator 26 can be provided in a variety of ways. For example, a simple buzzer can be used. Or, a loudspeaker can be used to render audible previously stored sounds (as stored in either analog or digital form). Mechanical bells and chimes and other electronic mechanisms are also all potentially useful depending upon the specific setting and application and depending also upon the number of unique audible sounds that are necessary to a given system.

Figure 3:
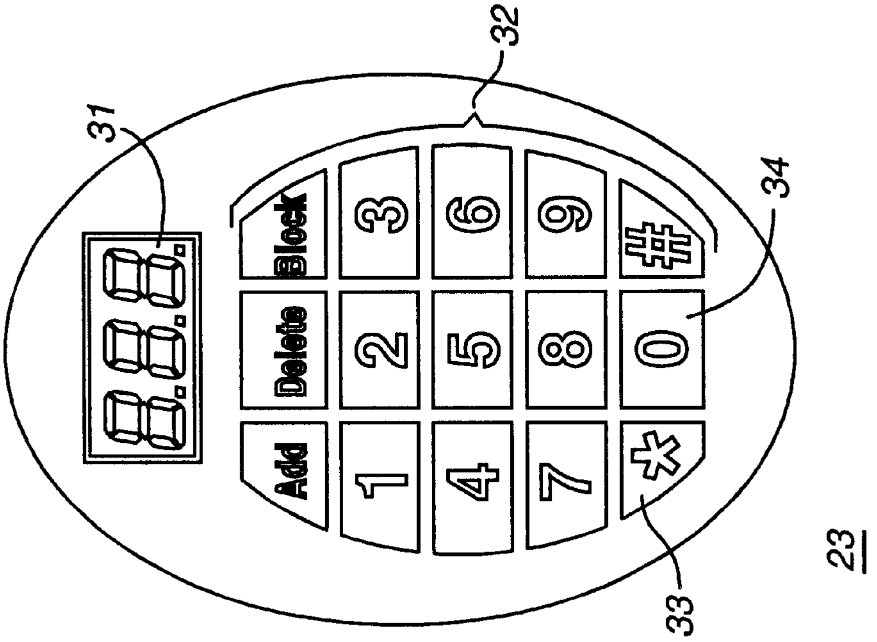
FIG. 3 comprises a front elevational view of a user interface of a control unit as configured in accordance with the invention.

Referring now to FIG. 3, the user interface 23 includes a display 31 and a keypad 32. The display 31 allows various information to be presented to the user as appropriate to various supported functionality. The keypad 32 comprises a tactile interface that allows a user to enter information and/or express commands to the control unit 11. For example, in this embodiment, to mute diagnostic audible signals, the user simply asserts the asterisk "*" key 33 combined with assertion of the "0" key 34. Once muted, the user interface 23 can again be used to un-mute these sounds by again asserting both the asterisk key 33 and the "0" key 34.

So configured, the control unit 11 comprises a programmable platform that is readily programmed to act as described herein and audible sounds are available to uniquely identify various diagnostic conditions.

Figure 4:
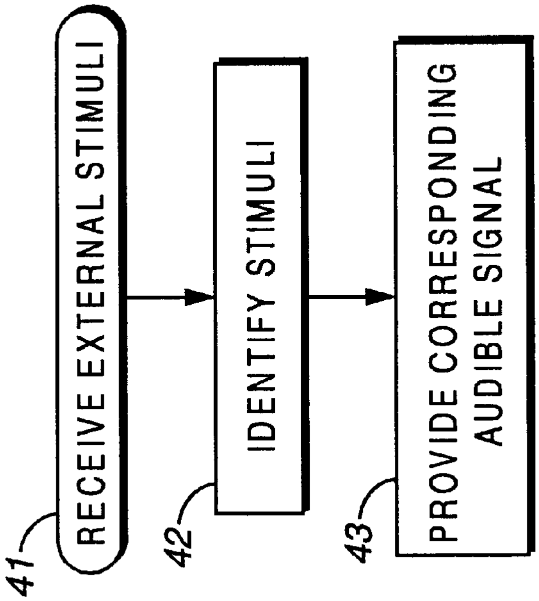
FIG. 4 comprises a high level flow diagram of an embodiment configured in accordance with the invention.

Referring now to FIG. 4, and viewing these embodiments generally, stimuli from some external source is received 41 and identified 42. For purposes of illustration, and continuing with the example of a movable barrier operator system, a wireless transmission is received and this stimuli from an external source is identified, for example, as constituting a particular type of transmission and/or as including information modulated or formatted in some particular way. A unique audible signal that corresponds to the characterization of the external stimuli is then provided 43.

Such a process is in addition to ordinary and normal processing of the external stimuli. For example, a transmission for a remote control transmitter in a movable barrier operator system will be demodulated and decoded (if possible) to authenticate the communication and, presuming its authorized status, used to control a corresponding movable barrier. Furthermore, such ordinary and usual processing may include audible signals provided in conjunction therewith. The diagnostic processing and the accompanying audible signals described earlier supplements such usual processing.

Figure 5:
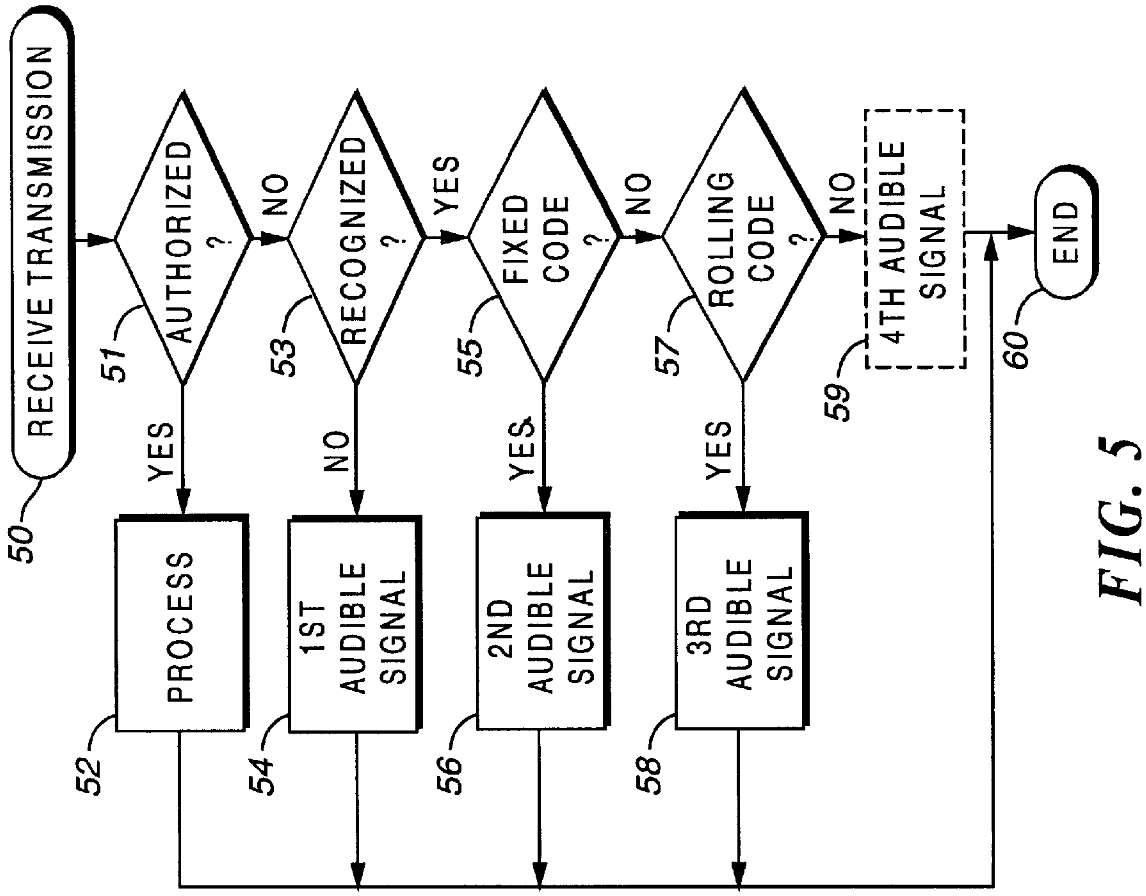
FIG. 5 comprises a flow diagram of an embodiment configured in accordance with the invention.

Referring now to FIG. 5, more specific embodiments as pertain to a movable barrier operator system will be provided.

Upon receiving 50 a transmission, the control unit 11 described above will ascertain 51 whether the transmission has been sourced by an authorized remote control transmitter. For example, the transmission will be decoded to recover a unique identifier that corresponds to the transmitter and to compare that unique identifier against previously registered identifiers. When a match occurs, the transmission is recognized as authorized and then processed 52 appropriately. For example, in the context of a movable barrier system, the movable barrier is moved from a present position to a new position. The above actions are representative of typical prior art practice and are illustrative only. They illustrate that the control unit 11, whatever it may be, carries on with its ordinary and customary functionality.

In addition, the control unit 11 also seeks to identify the external stimuli in a more diagnostic fashion. For example, in this embodiment, the control unit 11 examines the incoming transmission to determine whether the transmission can be recognized 53 (i.e., constitutes a recognizable modulation and/or coding format), and if recognizable, contains a unique identifier configured as a fixed code 55 or a rolling code 57. When the transmission simply can not be recognized 53, the control unit 11 provides a first audible signal 54 using the audio source 26 of the user interface unit 23. In this embodiment, the first audible signal comprises silence (in one embodiment as effected through temporary muting if necessary). When the transmission includes a fixed code 55 (regardless of whether the code itself is known or recognizable to the control unit 11) the control unit 11 provides a second audible signal 56 using the user interface audio source 26. For example, a series of fast tones or beeps can be used with the audio source comprises a monotonic source. As another example, when the audio source comprises a polytonic source, a single low-pitched tone can be provided. And as yet another example, when stored audio files are available, a speech signal stating "Fixed Code" or the like can be rendered audible.

In like fashion, when a rolling code is recognized 57, the control unit 11 provides a third audible signal 58, such as, for example, a series of slow tones or beeps. And lastly, as depicted in this embodiment, if the transmission is recognizable in general but appears to have neither a fixed code nor a rolling code, optionally a fourth audible signal 59, such as a series of fast tones followed by a series of slow tones can issue from the user interface audio source 26. Once all characterization tests have been conducted, then the process ends 60.

So configured, the control device 11 conducts its usual activities but also further examines the external stimuli to characterize the stimuli in various ways that, while not strictly speaking necessary to its ordinary functionality, nevertheless are helpful to a user when seeking to assess conditions to thereby diagnose and identify one or more likely causes of a given circumstance.

For example, a user approaches a movable barrier and asserts their remote control transmitter with no result; the movable barrier remains in position. Such a result can be due to a variety of causes. With the embodiments noted above, however, an individual such as the system administrator or the user can consider the audible signals as provided by the control unit 11 when transmitting. A specific audible signal as issued by the control unit 11 in response to a non-effective transmission can often aid greatly in quickly ascertaining the cause of the problem. In this example, presuming that no audible signal is provided, the likely cause can be identified as the transmitter battery. Or, if a particular audible signal as corresponds to a rolling code is provided, the system operator (knowing that the system comprises a fixed code system) will be able to quickly identify this as a cause for the transmitter to be unsuccessful (such a condition can arise, for example, with a dual-mode transmitter that becomes switched from a fixed code mode to a rolling code mode). Or, if the system is, in fact, a rolling code system, then the problem may be diagnosed as being due to the transmitter's rolling code having become out of synchronization with the code as stored by the control unit 11.

Figure 6:
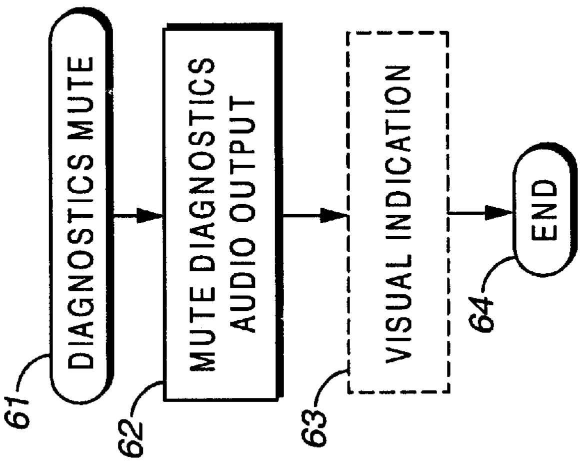
FIG. 6 comprises a flow diagram of an embodiment configured in accordance with the invention.

Notwithstanding the fact that such audible signals can powerfully assist diagnosis of a problem, the constant occurrence of such audible signals may be potentially distracting and/or bothersome during ordinary use when operation proceeds smoothly. Referring to FIG. 6, in an alternative embodiment a user can initiate 61 a diagnostics mute condition by asserting, using the user interface keyboard 32, a corresponding command. In this embodiment, entering the asterisk key 33 combined with the "0" key 34 constitutes this command. The control unit 11 then mutes 62 the audible signals as correspond to diagnostics processing and the process ends 64. To unmute these audible signals, the user need only repeat the above steps. It would of course be possible to provide a master mute that would inhibit all audible signaling from the control unit 11. In this above described embodiment, however, this mute process only mutes the audible signals as correspond to the diagnostics review and does not mute audible signals as correspond to the usual and ordinary functionality of the control unit 11. If desired, when muting the audible diagnostic signals, a visual signal can optionally be provided 63 to indicate this status. For example, when muted in this way, the right-most decimal point on the display 31 can be illuminated to indicate the muted condition.

So configured, many issues, problems, and concerns can be more quickly and easily diagnosed without requiring additional equipment, personnel, or training. Furthermore, by using an already existing platform in many cases, these benefits can be achieved at little or no incremental cost.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. In particular, specific embodiments have been presented to illustrate the concepts taught. The invention is not limited to these specific embodiments, however, and has application in a variety of settings where control devices of various types interact in various ways with external stimuli.

We claim:

1. A method for use with a movable barrier operator control unit having a plurality of actions, wherein at least some of the actions comprise a response to external stimuli, the method comprising:

- determining an identification of a specific external stimuli;
- providing a unique audible signal that corresponds to the identification of the specific external stimuli;
- providing an audible signal to indicate a predetermined status with respect to the responses to external stimuli;
- detecting assertion of a mute instruction, and in response thereto muting the unique audible signals that correspond to identification of the specific external stimuli but not the audible signals as indicates the predetermined status.

2. The method of claim 1 wherein determining an identification of a specific external stimuli includes determining that the specific external stimuli is not recognized.

3. The method of claim 1 wherein determining an identification of a specific external stimuli includes determining that the specific external stimuli comprises a first category of stimuli.

4. The method of claim 3 wherein determining that the specific external stimuli comprises a first category of stimuli includes determining that the specific external stimuli comprises a transmission from a remote control transmitter that includes an identifier that includes a rolling code.

5. The method of claim 3 wherein determining that the specific external stimuli comprises a first category of stimuli includes determining that the specific external stimuli comprises a transmission from a remote control transmitter that includes an identifier that includes a fixed code.

6. The method of claim 1 wherein determining an identification of a specific external stimuli includes determining at least one of the following:

- determining that the specific external stimuli is not recognized and providing a first unique audible signal;
- determining that the specific external stimuli comprises a transmission from a remote control transmitter that includes an identifier that includes a rolling code and providing a second unique audible signal; and
- determining that the specific external stimuli comprises a transmission from a remote control transmitter that includes an identifier that includes a fixed code and providing a third unique audible signal;
- wherein whichever of the first, second, and third unique audible signals are present are different from one another.

7. The method of claim 1 wherein not muting at least some of the audible signals as indicate the predetermined status includes not muting all of the audible signals as indicate the predetermined status.

8. A movable barrier operator control unit comprising:

- receiver means for receiving wireless communications;
- audio transducer means for providing a plurality of audible signals;
- control means operably coupled to the receiver means and the audio transducer means for providing control signals to another device when a wireless communication is at least received to cause the control signals to be provided to the another device and for causing provision of an audible signal to signal reception by the control means;
- diagnostic means operably coupled to the receiver means and the audio transducer means for ascertaining information regarding a source of a given wireless communication and for causing provision of at least one audible signal to uniquely characterize information regarding a source of a given wireless communication;
- mute means for selectively muting audible signals as correspond to at least some characterizing information regarding the source of a given wireless communication but not any audible signals as correspond to actions that correspond to the control means.

9. The device of claim 8 wherein the another device comprises a movable barrier operator.

10. The device of claim 8 and further comprising memory means operably coupled to the control means for storing identifying information of transmitters that are authorized to cause at least certain control signals to be provided to the another device.

11. The device of claim 8 wherein the information regarding a source of a given wireless communication includes information that corresponds to a type of transmitter identifier that the wireless communication includes.

12. The device of claim 11 wherein the type of transmitter identifier includes at least fixed code identifiers.

13. The device of claim 11 wherein the type of transmitter identifier includes at least rolling code identifiers.

14. The device of claim 11 wherein the type of transmitter identifier includes at least fixed code identifiers and rolling code identifiers.

* * * * *

UNITED STATES PATENT AND TRADEMARK OFFICE

CERTIFICATE OF CORRECTION

PATENT NO. : 6,832,076 B2

DATED : December 14, 2004

INVENTOR(S) : Study et al.

It is certified that error appears in the above-identified patent and that said Letters Patent is hereby corrected as shown below:

Column 5,
Line 62, delete "responses" and insert -- response --.

Signed and Sealed this

Twenty-sixth Day of July, 2005

JON W. DUDAS
*Director of the United States Patent and Trademark Office*